United States Patent
Wojciechowski et al.

(10) Patent No.: US 10,593,536 B2
(45) Date of Patent: Mar. 17, 2020

(54) UV MERCURY LOW-PRESSURE LAMP WITH AMALGAM DEPOSIT

(71) Applicant: Xylem IP Management S.à r.l., Senningerberg (LU)

(72) Inventors: Andre Wojciechowski, Essen (DE); Michael Lang, Köln (DE); Uwe Kanigowski, Velbert (DE)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 0 days.

(21) Appl. No.: 16/315,372

(22) PCT Filed: Jul. 7, 2017

(86) PCT No.: PCT/EP2017/067064
§ 371 (c)(1),
(2) Date: Jan. 4, 2019

(87) PCT Pub. No.: WO2018/007578
PCT Pub. Date: Jan. 11, 2018

(65) Prior Publication Data
US 2019/0244802 A1     Aug. 8, 2019

(30) Foreign Application Priority Data
Jul. 8, 2016     (EP) .................................. 16178650

(51) Int. Cl.
*H01J 61/04*     (2006.01)
*C02F 1/32*     (2006.01)
(Continued)

(52) U.S. Cl.
CPC ............ *H01J 61/045* (2013.01); *C02F 1/325* (2013.01); *H01J 61/20* (2013.01); *H01J 61/24* (2013.01);
(Continued)

(58) Field of Classification Search
CPC .......... H01J 61/045; H01J 61/24; H01J 61/20; C02F 1/325; C02F 2303/04
See application file for complete search history.

(56) References Cited

U.S. PATENT DOCUMENTS

| | | | |
|---|---|---|---|
| 3,890,531 A | * | 6/1975 | Panofski ................. H01J 61/72 313/490 |
| 3,898,511 A | | 8/1975 | Johnson et al. |

(Continued)

FOREIGN PATENT DOCUMENTS

| | | |
|---|---|---|
| DE | 20213210 U1 | 2/2004 |
| DE | 102013102600 A1 | 10/2014 |

(Continued)

OTHER PUBLICATIONS

International Search Report and Written Opinion for International Application No. PCT/EP2017/067064, dated Oct. 24, 2017—13 pages.

(Continued)

Primary Examiner — Joseph L Williams
Assistant Examiner — Jose M Diaz
(74) Attorney, Agent, or Firm — RatnerPrestia

(57) ABSTRACT

An ultraviolet mercury low-pressure amalgam lamp includes a tube having a first end and a second end, a first electrode placed in the first end of the tube, and a second electrode placed in the second end of the tube, whereby when the lamp is energized a discharge path is formed between the first and second electrodes. At least one amalgam deposit is adjacent to one of the first and second electrodes out of the discharge path between the first and second electrodes. The tube has at least one constriction, wherein the at least one amalgam deposit is placed behind the constriction with respect to the discharge path such that (Continued)

the at least one amalgam deposit is protected by the constriction from the heat emitted by the electrodes.

10 Claims, 1 Drawing Sheet

(51) Int. Cl.
    *H01J 61/20*     (2006.01)
    *H01J 61/24*     (2006.01)
    *H01J 61/72*     (2006.01)
    *H01J 61/33*     (2006.01)

(52) U.S. Cl.
    CPC .............. *H01J 61/33* (2013.01); *H01J 61/72* (2013.01); *C02F 2303/04* (2013.01)

(56) References Cited

U.S. PATENT DOCUMENTS

| | | | | |
|---|---|---|---|---|
| 5,274,305 A * | 12/1993 | Bouchard | ............... | H01J 61/28 315/108 |
| 5,767,617 A * | 6/1998 | Wharmby | ............... | H01J 61/24 313/489 |
| 6,337,539 B1 * | 1/2002 | Yorifuji | .................. | H01J 61/20 313/483 |
| 6,538,378 B1 * | 3/2003 | Nakano | .................. | H01J 61/24 313/571 |
| 2002/0057059 A1 * | 5/2002 | Ogishi | .................... | H01J 61/28 313/636 |
| 2004/0195954 A1 * | 10/2004 | Pirovic | ..................... | A61L 2/10 313/490 |
| 2006/0164000 A1 | 7/2006 | Nishimura et al. | | |
| 2009/0026965 A1 * | 1/2009 | Van Den Broek | ...... | H01J 61/28 315/115 |
| 2009/0146569 A1 * | 6/2009 | Krijnen | .................. | C03C 3/087 313/636 |
| 2010/0019651 A1 * | 1/2010 | Hellebrekers | .......... | C22C 12/00 313/490 |
| 2012/0091880 A1 | 4/2012 | Kong | | |
| 2014/0265825 A1 | 9/2014 | Jung et al. | | |

FOREIGN PATENT DOCUMENTS

| | | |
|---|---|---|
| GB | 828605 | 2/1960 |
| GB | 854388 | 11/1960 |
| JP | 2004178947 A | 6/2004 |

OTHER PUBLICATIONS

International Preliminary Report on Patentability for International Application No. PCT/EP2017/067064, dated Jan. 8, 2019, 8 pages.

* cited by examiner

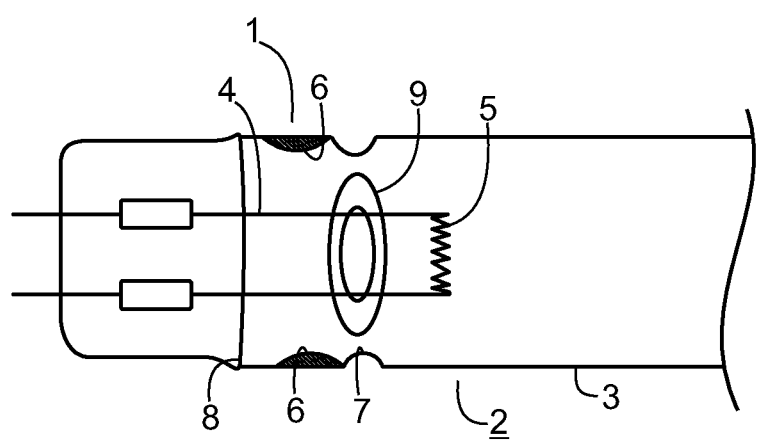

UV MERCURY LOW-PRESSURE LAMP WITH AMALGAM DEPOSIT

CROSS-REFERENCE TO RELATED APPLICATIONS

This patent application is a U.S. National Phase Patent Application of PCT Application No.: PCT/EP2017/067064, filed Jul. 7, 2017, which claims priority to European Patent Application No. 16178650.4, filed Jul. 8, 2016, each of which is incorporated by reference herein in its entirety.

FIELD OF THE INVENTION

The present invention relates to a UV mercury low-pressure amalgam lamp.

BACKGROUND OF THE INVENTION

Low-pressure mercury vapour discharge lamps are commonly used to generate ultraviolet radiation and used to irradiate a fluid to kill potentially harmful organisms contained in the fluid. In mercury-vapour discharge lamps, mercury constitutes the primary component for generating ultraviolet (UV) light. During operation of a low-pressure mercury vapour discharge lamp, the vapour pressure of the mercury greatly affects lamp operation. Commonly, amalgam is used to give off the mercury bonded thereto, thereby controlling the mercury vapour pressure within the so-called amalgam lamp. UV output of the lamp should be as efficient as possible. Therefore, UV transparent bodies need to be used for the production of these lamps. Low-pressure mercury vapour discharge lamps have a tubular lamp body made of quartz.

Conventional high output low-pressure lamps show high surface temperatures. The high temperatures have an unfavourable effect on the amalgam if the lamp is in operation for a long period of time. Often high power load of a lamp causes the amalgam to melt. If the amalgam melts, it may move out of position and could make contact with an electrode and cause possible shorting or ineffective operation of the lamp. In order to overcome this drawback, one option is to use special amalgam mixtures designed to withstand the heat. However, these special amalgam mixtures have a worse efficiency and shorter lifetime compared to standard amalgam mixtures used in standard lamps. Another option is to position the amalgam not too close to the electrode.

DE 10 2013 102 600 A1 discloses a lamp, which consists of a sealed quartz tube with electrodes on each end. The lamp tube contains a small amount of mercury and an inert gas, such as argon or neon, at a low pressure. A quartz tube section of smaller diameter is arranged within an end portion of the quartz tube forming a short section of a concentric double tube with an annular gap, wherein the gap is open towards the inside volume of the lamp. Amalgam is arranged in the annular gap and more precisely attached to the outer surface of the inner concentric tube. This arrangement makes it necessary to join the two concentric tubes at the end portion in a separate manufacturing step.

JP2004-178947A discloses a lamp for lighting purposes. The tubular main body is accordingly made of glass, not of quartz. A neck portion of the glass tube holds a coiled wire with a pitch that is narrower than some mercury allow particles which are thus held inside the coil. The particles are located inside the coil and cannot move inside the lamp, which would lead to damage of the phosphor layer of the lamp.

US2012/0091880A1 discloses another lamp for lighting purposes. The tubular outer housing in made of glass, and the amalgam is enclosed in a cold finger which is provided centrally on one end portion between the electric wires. An indentation of the cold finger prevents the amalgam from being removed from the cold finger. The production of his arrangement is more complex. It is feasible using glass tubes, as in this document. With quartz tubes, as needed for UV radiators, manufacturing seems to be complicated. The working temperature for glass is around 1,000° C., while the working temperature for quartz is above 2,000° C. Also, the temperature range, in which the material can be formed, is significantly narrower than the respective temperature range of glass. Therefore, method of manufacture of glass items cannot be directly adopted for quartz workpieces.

SUMMARY OF THE INVENTION

It is an object of the present invention to provide an alternative low-pressure mercury vapour discharge lamp that reduces the risk of an amalgam melting during high load. It can be another objection of the invention to allow high temperatures in the discharge path of a lamp while keeping the amalgam deposit relatively cool.

This problem is solved by a mercury low-pressure amalgam lamp with the features listed herein and an ultraviolet water disinfection system with the features listed herein.

Accordingly, an ultraviolet mercury low-pressure amalgam lamp comprising:

a UV transparent tube, preferably a quartz tube, having a first end and a second end; a first electrode placed in the first end of said tube; a second electrode placed in the second end of said tube, whereby when the lamp is energized a discharge path is formed between said first and second electrodes; and at least one amalgam deposit adjacent to one of said first and second electrodes at a distance from the electrodes outside the discharge path, which extends between said first and second electrodes, is provided, wherein the tube has at least one constriction wherein the at least one amalgam deposit is placed behind the constriction with respect to the discharge path such that the at least one amalgam deposit is protected from the heat emitted by the electrodes and/or by the discharge. Preferably, the UV transparent tube is an elongated, straight tube with an essentially cylindrical shape and an essentially circular cross-section, at least at the length of the discharge path.

Preferably, the at least one amalgam deposit is placed on the inner side of the quartz tube, i.e. on the inside of the outer wall.

It is advantageous, if the constriction is designed circumferentially which simplifies the manufacturing process, which can for example be carried out by a rolling procedure, in which the tube is heated and turned around its longitudinal axis, and a mechanical pressure is applied to the outside of the tube with a graphite tool or a roller, thereby forming the constriction.

In a preferred embodiment the internal cross section or diameter of the tube at the constriction is reduced by at least 5%, preferably by 5% to 50%, in particular by 5% to 25% or by 5% to 20% compared to the essentially constant internal cross section or diameter of the remaining tube, such that the amalgam deposit is shielded by the constriction from the heat emitted by the electrodes.

It is beneficial to arrange a shield plate made of a heat resistant, non-conducting material, for example a mica washer, between the at least one amalgam deposit and wound filaments of one of said first and second electrodes. The shield plate functions as an additional heat shield. Preferably, the heat shield is arranged on the respective electrode.

In addition an ultraviolet water disinfection system with at least one ultraviolet mercury low-pressure amalgam lamp with the features described above is provided.

In a preferred embodiment the amalgam is fitted to the outer wall of the tubular lamp body at a single location, preferably in the form of a spot of about 50 to 400 square millimeters.

BRIEF DESCRIPTION OF THE DRAWING FIGURE

A preferred embodiment of the present invention will be described with reference to the drawing.

The FIGURE shows an end portion 1 of a low-pressure mercury vapour discharge UV lamp 2 in lateral view.

DETAILED DESCRIPTION OF THE INVENTION

The UV lamp 2 displays, in a standard way, a sealed quartz tube 3 having an electrode 4 with a helically wound filament 5 which can be powered to start and maintain the gas discharge with an incandescent voltage and an operating voltage respectively. At an axial distance from the filament 5 an amalgam deposit 6 is provided which can consist, for example, of an indium-mercury amalgam. This amalgam is particularly highly efficient in operating the UV lamp 2. The amalgam deposit 6 is placed on the inside of the quartz tube 3. The quartz tube 3 has a constriction 7. This constriction 7 is arranged at an axial distance from the helical-wound filament 5, between the end of the quartz tube 8 and the helical-wound filament 5. The constriction 7 is placed outside of the discharge path and it separates the quarts tube into two sides respectively. The amalgam deposit 6 is placed on the side of the quartz tube 3 facing away from the helical-wound filament 5, in such a way that the constriction 7 shields the heat radiation emitted by the electrode 4. The constriction 7 is an indention of the quartz tube 3 from the outside to the inside, which can cover part of the circumference or more preferably can be designed circumferentially. The area of the free internal cross section of the quartz tube at the constriction 7 is reduced by at least 5% compared to the internal cross section of the remaining quartz tube, preferably, the reduction is between 5% and 50%, in particular between 5% and 25%. This way the height of the constriction 7 is at least equal to the height of the amalgam deposit 6. The constriction 7 is configured to effectively shield the amalgam deposit 6 from the thermal radiation originating from the filament 5 and also from the plasma discharge.

In another preferred embodiment two or more constrictions 7 are used to shield the amalgam from thermal radiation. Further, it can be preferred to use a mica flat washer 9, which is a flat disc with a centrally located hole. Mica flat washers have high heat resistance. They can be placed between the helical-wound filament 5 and the amalgam deposit 6 to protect the deposit 6 from the heat. Preferably, the mica washer 9 is arranged on the electrode 4, namely on the two wires that are electrically contacted with the helical portion of the electrode and mechanically hold the latter in place.

The amalgam deposit 6 can have any shape and size. The present invention is not limited to a single amalgam deposit 6. The constriction 7 and the corresponding deposit 6 can be arranged at one end portion 1 of the quartz tube 3 or at both end portions, or there can be more than one amalgam deposit behind the constriction.

The advantage of the present invention is that, due to the shielding, standard amalgam mixtures can be used and that there is no need to use special high temperature amalgams. This enhances lamp efficiency and lifetime.

The UV-lamps can be used for advance oxidation process (AOP), which uses ultraviolet light in conjunction with standard oxidants such as hydrogen peroxide or chlorine to achieve greatly increased performance by producing very reactive hydroxyl radicals.

The invention claimed is:

1. An ultraviolet mercury low-pressure amalgam lamp comprising:
    a tube having a first end and a second end;
    a first electrode positioned in the first end of said tube;
    a second electrode positioned in the second end of said tube, whereby, when the lamp is energized, a discharge path is formed between said first and second electrodes;
    at least one amalgam deposit adjacent to one of said first and second electrodes outside the discharge path between said first and second electrodes;
    at least one constriction disposed in the tube; and
    a thermally resistant plate arranged between the at least one amalgam deposit and a helical-wound filament of one of said first and second electrodes,
    wherein the at least one amalgam deposit is positioned behind the constriction with respect to the discharge path such that the at least one amalgam deposit is shielded by the constriction from direct thermal radiation emitted by the electrodes.

2. The ultraviolet mercury low-pressure amalgam lamp according to claim 1, wherein the at least one amalgam deposit is disposed on an inside of the tube next to the constriction.

3. The ultraviolet mercury low-pressure amalgam lamp according to claim 1, wherein the constriction extends circumferentially about the tube.

4. The ultraviolet mercury low-pressure amalgam lamp according to claim 1, wherein an internal cross section of the tube at the constriction is reduced by at least 5% as compared to an internal cross section of the remaining tube.

5. The ultraviolet mercury low-pressure amalgam lamp according to claim 1, wherein an internal cross section of the tube at the constriction is reduced by 5% to 50% as compared to an internal cross section of the remaining tube.

6. The ultraviolet mercury low-pressure amalgam lamp according to claim 1, wherein an internal cross section of the tube at the constriction is reduced by 5% to 25% as compared to an internal cross section of the remaining tube.

7. The ultraviolet mercury low-pressure amalgam lamp according to claim 1, wherein an internal cross section of the tube at the constriction is reduced by 5% to 20% as compared to an internal cross section of the remaining tube.

8. The ultraviolet mercury low-pressure amalgam lamp according to claim 1, wherein the thermally resistant plate is a mica washer.

9. The ultraviolet mercury low-pressure amalgam lamp according to claim 8, wherein the mica washer is arranged on the respective electrode.

10. An ultraviolet water disinfection system with the at least one ultraviolet mercury low-pressure amalgam lamp according to claim 1.

\* \* \* \* \*